United States Patent
Zampieri

[11] Patent Number: 5,122,233
[45] Date of Patent: Jun. 16, 1992

[54] APPARATUS FOR THE TREATMENT OF MIXTURE OF BRINES AND CONTAMINATED MINERAL SALTS

[76] Inventor: Charles Zampieri, Lenbachstr. 25, D-7000 Stuttgart 1, Fed. Rep. of Germany

[21] Appl. No.: 512,955

[22] Filed: Apr. 23, 1990

[30] Foreign Application Priority Data

Apr. 24, 1989 [DE] Fed. Rep. of Germany ....... 3913482
Jan. 11, 1990 [EP] European Pat. Off. ........... 90100543

[51] Int. Cl.$^5$ ..................... B01D 1/18; B01D 3/10
[52] U.S. Cl. ..................................... 202/205; 34/60; 34/92; 159/43.1; 159/45; 159/DIG. 16; 202/202; 202/236; 210/182
[58] Field of Search ............... 202/205, 202, 236, 237, 202/185.1; 203/91, 100, 90, 11, DIG. 17; 159/DIG. 38, DIG. 16, 43.1, 45, 3, 22; 432/105; 34/15, 60, 61, 92; 210/180–182

[56] References Cited

U.S. PATENT DOCUMENTS

| | | | |
|---|---|---|---|
| 3,966,541 | 6/1976 | Sadan | 159/47.1 |
| 4,141,696 | 2/1979 | Marion et al. | 261/114.1 |
| 4,336,136 | 6/1982 | Giguére | 210/182 |
| 4,421,594 | 12/1983 | Bildjukevich et al. | 159/48.1 |
| 4,629,500 | 12/1986 | Janz et al. | 423/632 |
| 4,781,837 | 11/1988 | Lefebvre | 159/DIG. 27 |
| 4,872,949 | 10/1989 | Wilwerding | 159/DIG. 10 |
| 4,876,802 | 10/1989 | Gergely et al. | 34/92 |
| 4,980,029 | 12/1990 | Bolz et al. | 202/105 |

OTHER PUBLICATIONS

Manjikian et al., "First International Symposium on Water Desalination", Oct. 3–9, 1965, Wash., D.C. pp. 1–20.
General Dynamics, General Atomic Division, Sep. 22, 1964.

*Primary Examiner*—Virginia Manoharan
*Attorney, Agent, or Firm*—Hodgson, Russ, Andrews, Woods & Goodyear

[57] ABSTRACT

An apparatus including a device 1 for separating organic components from a process mixture, a vacuum evaporation device 4 for partially drying the mineral salts or mixtures thereof, a device 5 for thermal treatment of the partially dried mineral salts or mixtures thereof from the vacuum evaporation device 4, a condenser 7 for condensing the humid vapors from the vacuum evaporation device 4 and a device 9 for reverse osmosis treatment of the condensate as well as suitable conveying devices between the parts of the apparatus.

10 Claims, 5 Drawing Sheets

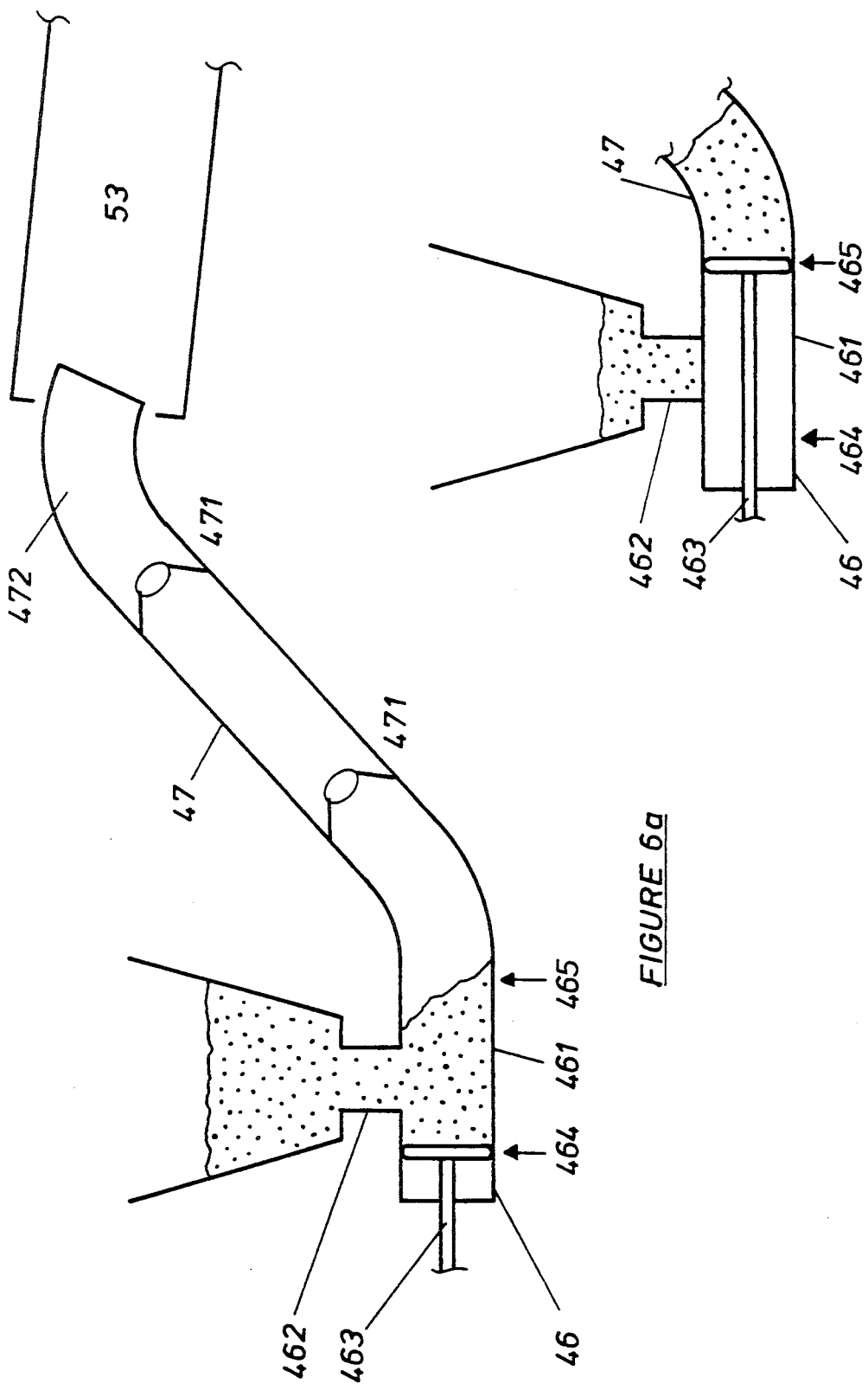

APPARATUS FOR THE TREATMENT OF MIXTURE OF BRINES AND CONTAMINATED MINERAL SALTS

DESCRIPTION

The invention concerns a process as well as an apparatus for the treatment of brines and contaminated mineral salts or mixtures thereof. In particular, the invention concerns a process and an apparatus by means of which supersaturated brines or contaminated mineral salts or mixtures thereof can be freed of such contaminations which occur during preparation and curing of animal hides with mineral salts, especially with sodium chloride, before the manufacture of leather. Such contaminations can, for example, be animal dung and urine, remains of blood, skin and flesh, as well as hair.

The hide removed from the animal carcass, the so-called "green hide", is very rarely tanned immediately after slaughtering and processed to leather in the leather factory. It takes time, often weeks or months, to collect major batches of hides, to sort them by weight and quality categories, to compile the parcels and to transport them from the slaughterhouse or place of preparation, respectively, to the leather factory. However, owing to their protein structure, uncured and untanned hides left in the natural wet state are often infested by putrefactive bacteria and mould which find optimal conditions for reproduction in the damp raw hides often exposed to warm weather. In order to prevent infestation with and reproduction of putrefactive bacteria on the raw hides these must be cured.

Even though other curing processes have been proposed for ecological reasons, only curing with sodium chloride has really been successful. Moreover, only curing with sodium chloride has so far fulfilled the two essential conditions required of such curing: Firstly, curing must result in a lasting bactericidal effect and thus prevention of putrefaction and mould infestation of the raw hide. Secondly, it must be possible to process the hide to faultless leather after curing and extended storage, i.e. to fully undo the curing. Both requirements are optimally met by the curing by means of sodium chloride.

In detail, curing of raw hides by means of sodium chloride is effected in such a way that the hides are precleaned superficially and then sprinkled with solid sodium chloride containing common denaturants such as naphthalene or similar organic compounds or are soaked in a saturated or supersaturated brine for up to 24 hours. When the hides are stacked or folded into packets, either solid salt comes off the salted parts or saturated or supersaturated brine drips from the hides. In the past, it was customary to let off the solid or dissolved quantities of salt thus obtained straight into sewage canals or into the environment, which has resulted in an unacceptable pollution of lakes and rivers with sodium chloride in high concentrations.

In addition, the curing salt is dissolved by steeping the hides in water before they are tanned or processed to leather, respectively. The water left over from this step which contains salt in high concentrations is also let off into the sewage canals or immediately into the rivers. This, too, results in an unacceptable increase of the salt concentration in natural waters.

Another disadvantage of the traditional disposal of the salt quantities resulting from the curing of raw hides is the fact that the sodium chloride, which has become increasingly expensive, cannot be recycled. Therefore, the purchase cost for mineral salt is fully added to the price of the cured hides.

A process and a device, respectively, for treating contaminated mineral salts or mixtures thereof is described in the parallel German patent application P 3835418.7 submitted on Oct. 17, 1988. In this patent application, there is described the treatment of contaminated mineral salts or mixtures thereof in a heatable retort by continuous or step-by-step heating to over 350° C. for a period of at least four minutes. The gases and vapors developing during this heating process are let off into the atmosphere. This retort is preferably shaped as an upright cylindrical tube and can be heated over its entire length to the required process temperature by means of a heating spiral. The serious disadvantage of this process or the device described in the application, respectively, is the requirement that only precleaned mineral salts which are essentially free of solid contaminations can be used. Organic components caused by the process are not separated. Moreover, there is a risk with this device that the increasingly thickening salt layer is deposited on the heated inner walls of the retort, making the heat transmission more difficult and, as the thickness of the layer increases, encumbering and eventually preventing the penetration of gases and salt inside the retort. Other processes known from the prior art are carried out at treatment temperatures which are so low that the salts thus obtained are not free of germs owing to the comparatively low temperatures.

It is the object of this invention to overcome the disadvantages of previous means or the processes carried out therewith, respectively. The new apparatus according to the invention is to provide a means where clogging by deposition and the resulting decreasing effectiveness of a means for the recycling and purifying treatment of brines and mineral salts during extended continuous or intermittent operation can be avoided.

Not only for reasons of keeping environment pollution low, but also for cost reasons it was further desirable to provide a process and an apparatus which does not only achieve desalinisation of the process water obtained during the dressing of raw hides, but also makes it possible to process brines and the mineral salts or mixtures thereof containing said contaminations in such a way that they become free of contaminations and can be used again for the repeated process of curing.

It was a further object of the present invention to provide the salts obtained on the occasion as pourable granulates having a granule size which can be adapted according to the relevant requirements of the users.

It was an additional object of the invention to process the contaminated mineral salts in such a way that the resulting salt products are free of germs.

Finally, it was also an object of the invention to provide a process suitable for processing brines and contaminated mineral salts or mixtures thereof which can be carried out continuously or intermittently in an energy saving manner and in simple designs. The products of such a process are not only to be salts of a quality corresponding to the requirements of the users but also water of the highest possible purity which can be channelled once more into the process water or drinking water cycle. It is the intention of such a process to recover all the process products in a high quality and thus to be able to use them repeatedly in an economically meaningful manner.

It has now been found that the above-named technical problems can be solved by the process indicated below and by providing the device indicated below.

The invention concerns a process for the treatment of brines and contaminated mineral salts and mixtures thereof comprising the steps of (a) substantially separating organic components from the process mixture,
(b) subjecting the resulting mixture to vacuum evaporation step,
(c) thermally treating the partially dried mineral salts or mixtures thereof at an elevated temperature and thereafter obtaining pure dry mineral salts or mixtures thereof,
(d) condensing the vapor resulting from the vacuum evaporation step and subjecting said vapor to a reverse osmosis step and
(e) obtaining from said reverse osmosis step pure water.

In addition, the invention concerns an apparatus for treating brines or contaminated mineral salts or mixtures thereof comprising (a) a means 1 for separating organic components from the process mixture,
(b) a means 4 for vacuum evaporation in order to partially dry the mineral salts or mixtures thereof,
(c) a means 5 for thermal treatment of the partially dried mineral salts or mixtures thereof resulting from said means 4 for vacuum evaporation,
(d) a condenser 7 for condensing the humid vapors resulting from said means 4 for vacuum evaporation and
(e) a means 9 for reverse osmosis treatment of the condensate resulting from step (d), as well as
(f) conveying means 13, 71, 93 connecting in series said means 1 for separating organic components, said means 4 for vacuum evaporation, said condenser 7 and said means 9 for reverse osmosis treatment, as well as conveying means 41 for connecting said vacuum evaporation means 4 with said means 5 for the thermal treatment of said salts.

Brines treated in the process according to the invention are aqueous solutions containing mineral salts and primarily sodium chloride and result from the curing treatment of raw hides or the steeping of cured hides before tanning. The salt content of these aqueous solutions can be under the saturation point of the solution under conditions of application. However, it is also possible to treat supersaturated aqueous brines according to the process of the present invention. For the purposes of the present invention mineral salts are understood to be all compounds of metal cations with acid radicals of mineral acids. Mixtures of such mineral salts are also comprised by the present invention. Preferably, the term "mineral salts" is understood to comprise such salts as used in the curing treatment of raw hides. Especially sodium chloride is one of those salts; however, the invention is not limited to the treatment of sodium chloride or salt mixtures or brines containing sodium chloride, even if it is illustrated using this especially preferred embodiment.

In the first step of the process according to the invention for treating brines, contaminated mineral salts and mixtures thereof organic components are substantially separated from the process mixture. Such organic components are mainly animal recrements left over from the slaughtering process such as animal dung and urine, remainders of flesh and skin as well as hairs. This first process step is based on the realisation that said recrements partially contain recoverable components which can be directed towards systematic reuse, to be used, for instance, as fodder. The most simple and economical separation from the brines or mineral salts or mixtures thereof, respectively, is effected in multiphase systems such as flotation, filtration, decantation and centrifugal systems. Flotation processes are preferred for this purpose. In such a process, the brines or mineral salts or mixtures thereof, respectively, contaminated with said organic components are fed to an aqueous flotation system by means of a suitable flotation agent in a manner which is known per se from the prior art. Flotation agents can preferably be $FeCl_3$ or siliceous earth. The temperatures are usually between 5° to 25° C.; room temperature is preferred. As a result of the effect of the flotation agents, the organic components float to the surface and can be skimmed therefrom in the customary manner. What remains are—sometimes supersaturated—salt solutions containing the undissolved salt portions as a non floatable solid remaining at the bottom of the solution. According to other preferred embodiments of the invention, filters, decanters or centrifuges can also be used instead of a flotation means.

In a preferred embodiment of the process the muds containing floated organic components are then recycled for reuse, for instance as fodder. If necessary, they can be washed in order to remove the flotation agents. They are then dried in a manner which is known as such and pulverised to be used, for example, as a fodder additive.

In the next step of the process according to the invention, the aqueous mixture which is left over after separation of the organic components and which may contain undissolved mineral salts as a non floatable solid remaining at the bottom, is subjected to a vacuum evaporation step. For this purpose, the mixture is preferably fed into a closed vessel, for instance an autoclave or such like, wherein it can be moved by means of the customary agents, for instance stirred.

In a preferred embodiment of the present invention the vacuum evaporation treatment of the aqueous solution or mixture, respectively, is carried out in a pressure vessel which is capable of sustaining the pressure of this process step and, optionally (and then preferably), controllable by a thermostat, said pressure vessel having the shape of a cylinder with a cone tapering sideways attached to its lower end or the shape of a cone tapering downwards. The aqueous solution or mixture is fed to the inside of the vessel via suitable feeding lines, preferably nozzles, where it is exposed to an increased temperature and reduced pressure. The temperature is applied to the outer wall of the pressure vessel by sources of heat operating outside the vessel, preferably a fuel liquid or a fuel gas flowing in the thermostat casing. The vacuum is created by traditional vacuum pumps connected with the pressure vessel by a tube going out at the top end of the vessel. Salt separated during the vacuum evaporation trickles down into the vessel and is removed intermittently or continuously—optionally by means of a lock chamber—and directed towards the following process steps. The special advantage of a lock chamber for the removal of the salt is seen to be that continuous operation of the vacuum evaporation means under unchanging vacuum conditions is possible while salt is nevertheless permanently withdrawn. According to the invention, it is preferred to obtain comparatively large salt crystals, for example with a granular size of 0.2 to 0.3 mm so that said salt crystals are not carried along by the stream of vapor to cause problems during the subsequent steps of treating the liquid phase. In a specially preferred embodiment of the process according to the invention this can be achieved by feeding the aqueous solution or mixture into the vessel through a line ending in an annular nozzle inside the vessel, said annular nozzle having an optional number, preferably, for example, six to eight, of individual nozzles for spray distribution of the solution or mixture, respectively, within the vessel. This is conducive to an even distribution of the aqueous phase inside the vessel and thus a continuous evaporation process, which not only leads to a continuous stream of vapor at unchanging vacuum conditions, but also to the formation of even salt crystals. Within certain limits, the size of the crystals can even be controlled by the injection speed or injection pressure, respectively, the size of the nozzles, the temperature inside the vessel, etc.

The vapor resulting from the evaporation step is drawn off through the tube going off at the top end of the pressure vessel, said tube forming the connection with the vacuum pump or pumps, respectively. This tube is cooled by a cooling system connected to a cooling aggregate, preferably an intensive cooling system which runs in a helix-type manner inside the vessel. The temperatures of the cooling system are between 8° and 12° C. at the entry point (at the lower end of the tube in relation to the direction of the vapor flow) and 14° to 32° C. at the exit point (at the upper end of the tube in relation to the direction of the vapor flow). Thus, cooling preferably takes place by reverse flow cooling. Owing to the intensive cooling system, which is placed inside the vapor escape tube in a space-saving manner, complete condensation of the vapor is achieved.

In another preferred embodiment according to the invention one or several vapor traps are positioned in the vapor escape tube beyond the exit from the pressure vessel and a certain distance thereafter, preferably after a bend in the tube, which can, for example, be simple obstacles projecting into the course of the vapor. In a specially preferred way, the first obstacle is installed immediately beyond the exit of the vapor escape tube from the pressure vessel. Salt crystals which may have been carried along by the vapor are separated at this point and drop back into the pressure vessel so that the condensate is not contaminated later by larger quantities of salt carried along. Moreover, such vapor traps form an obstacle against a considerable decrease of pressure; thus, the process pressure can be maintained more evenly.

At the lower end of the vapor escape tube the condensate is let out into a reservoir and removed continuously or intermittently.

In a preferred embodiment of the process according to the invention, the vacuum evaporation step is carried out at a pressure in the range of 0.5 to $10^{-3}$ bar, even more preferably, in the range between $10^{-1}$ and $10^{-2}$ bar. The process temperatures are advantageously in the range between 20° to 50° C., more preferably between 42° and 50° C. The advantage of concentrating the aqueous mixture by means of vacuum evaporation in comparison with processes known so far, for example treatment in a heated retort, must be seen in the fact that, by using the process according to the invention, a steam containing hardly any salts any more can be obtained in an energy-saving manner on the one hand, and mineral salts or mixtures thereof having a considerably reduced humidity content, preferably a maximum humidity content of 40% and, even more preferably, a maximum humidity content of 25 to 35%, are obtained on the other hand. There is no danger of clogging in the means or individual parts thereof or of a deterioration of the energy exploitation by salt layers encumbering heat transmission.

In another preferred embodiment of the process the aqueous mixtures fed to the vacuum evaporation step are preheated by waste heat occurring elsewhere in the process. For example, the warm air resulting from the thermal treatment of the salts described below can be used to heat the aqueous mixtures to a temperature between 20° and 50° C., preferably between 42° to 50° C., and to maintain such a temperature during the course of the vacuum evaporation step, i.e. to provide the necessary evaporation heat. The energy saving increases the profitability of the process.

In the most preferred case, the mineral salts or mixtures thereof, respectively, which are obtained as products of the vacuum evaporation step and which are partially dried consist almost exclusively of sodium chloride and, of course, water. However, said sodium chloride can be mixed with other salts as well as small quantities of natural or process-caused contaminations, such as chlorides of other metals, bromides, iodides, carbonates, hydrogen carbonates, phosphates or sulphates or other salts. In the next step of the process according to the invention, the mineral salts or mixtures thereof, respectively, are subjected to a thermal treatment at an elevated temperature. Preferably, mineral salts or mixtures thereof having a maximum humidity content of of 40%, most preferably having a humidity content between 25 and 35%, are subjected to the thermal treatment. This can be carried out by traditional means, for example a conveyor belt or a conveyer spiral. In a preferred embodiment of the process according to the invention the mineral salt or mixture thereof to be thermally treated is fed to the rotary tubular kiln by a stuffing conveyor means. Said means can for example consist of a cylinder having a supply nozzle or supply container on the side wherein a stuffer can be moved manually or mechanically over a distance extending (in the direction of the flow of the supplied salt) from a point in front of the lateral supply nozzle to a point beyond said lateral supply nozzle. By moving the stuffer in the cylinder—while the supply nozzle is closed—a certain quantity of salt is conveyed in the direction of the rotary tube and fed to a tube connected to the stuffing conveyor means, the open end of said tube extending to the feed opening of the rotary tube. After that, the stuffer is withdrawn. Suitable devices in the tube, for example a conus tapering in the flow direction of the mineral salt or mixture thereof, respectively, can prevent the salt falling back. When the stuffer has returned to the original position, the supply nozzle is opened so that additional salt can be supplied, which is then conveyed by the stuffer towards the rotary tube once the supply nozzle is closed again. The advantage of this stuffing conveyor means is to be seen in the fact that salt conveyed in the direction of the tubular kiln does not clog the feed opening, if the conveying must be interrupted for some reason and the mineral salt or mixture thereof, respectively, absorbs humidity in the conveying means and sticks together when left standing for a longer period of time, for instance over night. The stuffing conveyor means preferred according to the invention makes it possible to restart conveying the mineral salt or mixture thereof to the rotary tube without problems even after it has been left standing for a longer period of time.

In a special embodiment of the process the mineral salts or mixtures thereof obtained by the vacuum evaporation step can be united with additional salts of similar consistency, which are referred to as so-called waste salts from the operation. Said waste salts have a maximum water content of 40% and are free of rough organic contaminations such as remainders of dung or urine, blood, flesh, skin and such like. Such salts can for instance be fed into a separate storage tank, therein mixed with the salts obtained from the vacuum evaporation step and then be conveyed to the thermal treatment, or be conveyed immediately to the thermal treatment separately from the mineral salts or mixtures thereof.

It is true that the thermal treatment of the mineral salts or mixtures thereof, respectively, according to the invention can be carried out by any method known to the person skilled in the art from the prior art, as long as the object of the invention, namely to produce mineral salts of high purity and free of germs is achieved. However, it corresponds to a preferred process method to carry out the thermal treatment in a rotary tubular kiln. The design and function of such a rotary tubular kiln may be known to the person skilled in the art from the prior art. Advantageous and therefore preferred is a rotary tubular kiln having a diameter of or above 450 mm and a length of or above 1,500 mm.

The rotating speed of such a kiln is preferably variable and can be adapted to the relevant process situation, for example to the water content of the mineral salts supplied or the speed in which the mineral salts are supplied and must, consequently, also be withdrawn from the kiln. Preferably, the rotating speed varies in the range between 5 and 20 rotations/minute. Another preferred embodiment of the process is to supply the mineral salts or mixtures thereof of the previous vacuum drying step to a rotary tubular kiln which is inclined downwards in the direction of the flow of the salt at an angle (alpha) of 2° to 10°, preferably 3° to 5°. This makes it possible to adjust the flow of the treated salt to the exit of the rotary tubular kiln which is adaptable to the relevant process conditions also with regard to speed without having to provide costly devices inside the kiln for this purpose.

It is further preferred according to the invention to charge the rotary tubular kiln with hot gases in order to produce higher temperatures. These can be oxygen-free gases which are brought to the required process temperature with the aid of suitable technical devices, for example heating spirals or heat exchangers, and which are admixed with oxygen or gas mixtures containing oxygen. However, the means for the process according to the invention is preferably charged with combustion gases and, even more preferably, with combustion gases from a gas-burner to which said combustion gases oxygen or oxygenic gas mixtures, especially air, are admixed. It has turned out to be especially preferable for thermal treatment of the partially dried mineral salts and mixtures thereof according to the invention to charge the rotary tubular kiln with combustion gases from a gas-burner of suitable size and a combustion output adaptable to this process step and to admix to the stream of gas an amount of air corresponding to a surplus of 100 to 300%, preferably 200%, related to the amount of oxygen required for the complete combustion of all remaining organic components of the mineral salts. The amount necessary to adapt to the relevant process situation can easily be determined by the person skilled in the art by measuring the oxygen concentration in the waste gases. This ensures that all organic components, especially micro-organisms such as bacteria and spores still contained in the mineral salt or mineral salt mixture, respectively, are invariably eliminated without residue under the process conditions and combusted to gases which are not harmful to the environment. Consequently, soot or toxic gases resulting form an incomplete combustion do not occur.

In accordance with the invention, the thermal treatment of the mineral salts or mixtures thereof is carried out at an elevated temperature. The temperature is preferably in the range of 140° to 500° C., even more preferably between 300° to 400° C. This temperature is reached at the hottest spot of the kiln, which, as a rule, is at the tip of the flame of the gas-burner, and is also measured there. By carrying out the treatment in these preferred ranges it can be ensured that all organic components remaining in the salt or mixture thereof, respectively, are combusted completely and do not contain any micro-organisms thereafter which could cause damages to the raw hides if the salt is used again. In this respect, the process according to the invention is clearly superior to the processes of the prior art. In addition, the salt thus obtained is odourless and flawless in colour, i.e. white.

As already pointed out above, the hot waste gases of this process step can not only be used to preheat the mineral salts or mixtures thereof, respectively, which are fed to the means for thermal treatment or the rotary tubular kiln, respectively. Rather, the hot waste gases can also be used to preheat the substances employed in other process steps of the present process, for example to preheat the brine or the mineral salt or mixture thereof, respectively, for vacuum evaporation. It goes without saying that the surplus heat can also be used for non process-bound purposes. This further increases the profitability of the process of the invention, especially if energy costs are at a high level.

In another preferred embodiment of the process according to the invention, the mineral salt or the mixture thereof, respectively, is ground to the granule size desired by the users at the end of the thermal treatment or thereafter. In a preferred embodiment of the process the granule size can be <0.1 mm to 0.6 mm and is especially preferred at 0.2 mm to 0.5 mm. Even though separate grinding in a grinder positioned downstream is possible, it is preferred in accordance with the invention to grind the salts in a grinding chamber positioned inside the rotary tubular kiln in front of the salt exit. Said chamber is equipped with grinding balls which can be selected by the person skilled in the art in accordance with the process conditions and the desired granular size. Moreover, a sieve positioned in front of the exit can prevent salt granules or chunks exceeding the desired size from leaving the rotary tubular kiln. The salt thus obtained is pourable and can be reused without problems for curing raw hides.

When treating the process mixture, which has substantially been freed of organic components, by a vacuum evaporation step, steam is obtained in addition to the mineral salt or a mixture thereof, and said steam is expanded and fed to a condenser. It is inherent to the method that, at least in the less preferred embodiments of the process, it cannot be fully prevented at all times that small amounts of salt are carried along which are then found in the condensate. Usually, the salt content is in the range of 0.1 to 5 g/l of the condensate, preferably between 0.5 to 2 g/l of the condensate. In order to obtain actually pure, salt-free water—as opposed to that obtained by the prior art—the condensate is subjected to a reverse osmosis in a subsequent process step.

The speed, the pressure and the temperature of the vacuum evaporation step are preferably controlled in such a way that the condensate can be continuously subjected to reverse osmosis. Alternatively, however, it is also possible to channel the condensate of the vacuum evaporation step and of the subsequent condensation step first to a storage tank and and then to feed said condensate to the reverse osmosis step. A third, preferred possibility is seen in providing for both steps mentioned above and to interpose the storage tank only if and when the immediate supply to the reverse osmosis step is not possible for capacity reasons because the obtained amount of condensate is high. It is a further advantage of the third alternative that the means for reverse osmosis can also be switched off for a short time, for instance for cleaning or for exchanging the membrane, without having to interrupt the entire process.

The reverse osmosis step is carried out under process conditions known per se. For example, a pressure of 1 to 30 bar, preferably 5 to 20 bar, is applied to the membrane side. The subsequent flow rate of the condensate can be at 500 to 5,000 l/h, preferably 100 to 1,000 l/h, the result being equally favourable in all cases, i.e. pure water being obtained as permeate of the reverse osmosis step. As is customary, the temperatures are in the range between 0° to 30° C., preferably in the range between 5° and 20° C. The usual semipermeable membranes of polymers such as composite materials of polyamides and polysulphones or cellulose acetate, preferably polyamide/polysulphone composite materials, having a pore width in the range of 0.5 to 1 nm, preferably 0.5 to 0.8 nm, can be used.

The residue obtained from the reverse osmosis step is not disposed of, since it still contains salts and therefore valuable substances. Therefore, the residue is subject to thermal treatment at an elevated temperature in a preferred embodiment of the process. This can take place in a special process step especially adapted to the conditions. It is particularly preferred, however, to unite the residue of the reverse osmosis step with the partially dried salts from the vacuum evaporation for thermal treatment and to thermally treat both components together, especially in a rotary tubular kiln. For this purpose, the residue from the reverse osmosis step is either directly united with said salts or is supplied to a storage tank together with said salts from which tank the means for thermal treatment can be fed. It is another preferred embodiment to subject the residue from the reverse osmosis step to a repeated vacuum evaporation step. For this purpose, said residue is united with the process mixtures having undergone flotation and substantially having been freed of organic components, and the two are fed to the means for vacuum evaporation.

As a result, pure water wherein no salts can be detected is obtained as permeate of the reverse osmosis step. The water can either be reused as process water or fed into the drinking water cycle. According to the prior art, it was not possible to obtain water completely free of salt alone from the brines in question.

As repeatedly pointed out above, the process of the present invention can be carried out either continuously or intermittently. The continuous process step is preferred.

Below, the apparatus of the invention is illustrated in greater detail with reference to the attached drawings.

BRIEF DESCRIPTION OF THE DRAWINGS

FIG. 6 shows a cross section through the stuffing conveyor means which is preferred for feeding the rotary tubular kiln 53.

DETAILED DESCRIPTION OF THE PREFERRED EMBODIMENT

Figure 1:
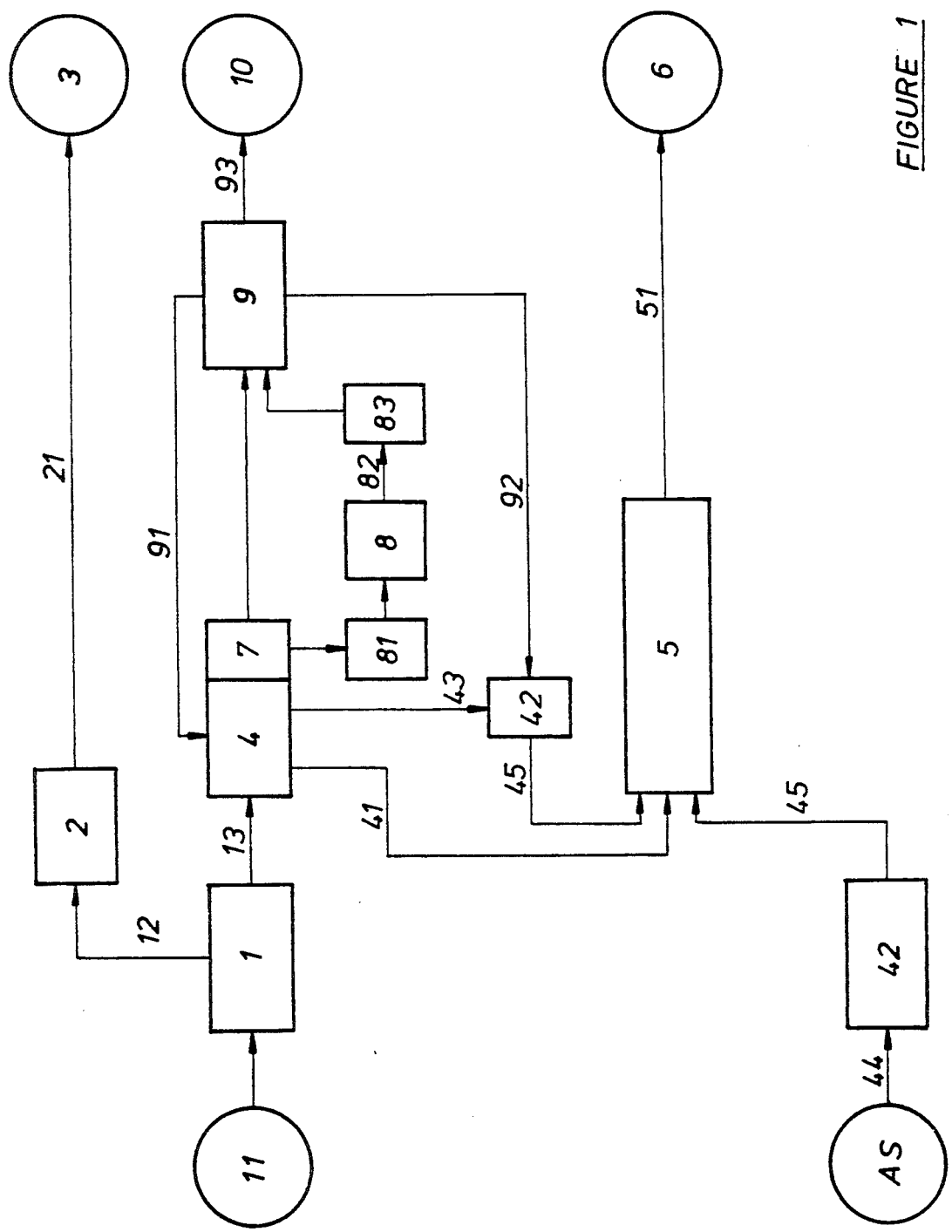
FIG. 1 shows a flow diagram of the process according to the invention and at the same time a diagram of the positioning of the means characterising the apparatus according to the invention for treating brines or contaminated mineral salts or mixtures thereof, respectively.

The apparatus for the treatment of brines or contaminated mineral salts or mixtures thereof comprises a means 1 for separating the organic components from the process mixture. Preferably, this means is a flotation means. However it can also consist of a filter, a decanter or a centrifuge. The advantage of the flotation means is that separation of the organic components from the process mixture can substantially be achieved in a simple and efficient manner without using complicated apparatuses. A centrifuge is also efficient in separating organic components.

In a preferred embodiment there is positioned downstream of the means 1 for separating the organic components a means 2 for drying and pulversing the separated organic components. The two means 1 and 2 are connected by a conveying means 12 which can, for example, be a conveyor belt, a line or such like. The products obtained from the drying and pulverisation step in the means 2 are either removed immediately and sold—either in packaged form or as bulk products—or they are fed into a storage tank 3 via a withdrawing line 21 or such like.

A vacuum evaporation means 4 for partially drying the mineral salts or mixtures thereof is positioned downstream of the means 1 for separating organic components via a line 13. This can preferably be a customary vessel resistant to pressure, for example an autoclave comprising the devices for moving, for example stirring, of the contents, the devices for supplying and withdrawing the components involved, the devices for applying pressure, etc., which are necessary for the purposes on hand. A condenser 7 wherein the expanded steams from the means 4 are condensed can be positioned downstream of said vacuum evaporation means 4 via a line 71. The condensers and coolers known from the prior art can be used as condenser 7.

In a preferred embodiment of the apparatus according to the invention the vacuum evaporation means is a pressure vessel capable of sustaining the pressure of this process step and, optionally (and then preferably), controllable by a thermostat, said vessel having the shape of a cylinder with a cone tapering sideways attached to its lower end or the shape of a cone tapering downwards. The aqueous solution or mixture is supplied via suitable feeding lines, preferably via nozzles and especially preferably via an annular nozzle fed via suitable feeding lines outside the vessel. Sources of heat operating outside the vessel, preferably a fuel liquid or a fuel gas flowing in the thermostat casing, make it possible to heat the vessel to process temperature. The vacuum is created by traditional vacuum pumps connected to the pressure vessel by a tube going out at the top end of the vessel.

In a preferred embodiment the lower end of the cone or the taper of the vessel leads out into a lock chamber for withdrawing the salt, said lock chamber being connected to a storage tank for storing the salt or to a conveying means for conveying the salt. The special advantage of a lock chamber for removing the salt is seen to be the fact that continuous operation of the vacuum evaporation means under unchanging vacuum conditions is possible while salt is nevertheless permanently removed.

In a specially preferred embodiment of the apparatus according to the invention the line by means of which the aqueous solution or mixture is fed to the vessel ends in an annular nozzle inside the vessel, said annular nozzle having an optional number, preferably, for example six to eight, of individual nozzles, for spray distribution of the solution or mixture, respectively, inside the vessel. This is conducive to an even distribution of the aqueous phase inside the vessel and thus a continuous evaporation process, which not only leads to a continuous stream of vapor at unchanging vacuum conditions, but also to the formation of even salt crystals.

A tube forming the connection with the vacuum pump or vacuum pumps, respectively, and additionally serving to draw off the steam formed during the vacuum evaporation step is attached to the top end of the pressure vessel. This tube has a cooling system connected to a cooling aggregate, said system preferably being an intensive cooling system which runs in a helix-type manner inside the tube in a specially preferred embodiment. The temperatures of the cooling system are between 8° and 12° C. at the entry point (at the lower end of the tube in relation to the direction of the vapor flow) and 14° to 32° C. at the exit point (at the upper end of the tube in relation to the direction of the vapor flow). Thus, cooling preferably takes place by reverse flow cooling. Owing to the intensive cooling system, which is placed inside the vapor escape tube in a space-saving manner, a complete and energy-saving condensation of the vapor is achieved.

In another preferred embodiment according to the invention one or several vapor traps are positioned in the vapor escape tube beyond the exit from the pressure vessel and a certain distance thereafter, preferably after a bend in the tube, which can, for example, be simple obstacles projecting into the course of the vapor. In a specially preferred way, the first obstacle is installed immediately beyond the exit of the vapor escape tube from the pressure vessel. Salt crystals which may have been carried along by the vapor are separated at this point and drop back into the pressure vessel so that the condensate is not contaminated later by larger quantities of salt carried along. Moreover, such vapor traps form an obstacle against a considerable decrease of pressure; thus, the process temperature can be maintained more evenly.

At the lower end of the vapor escape tube, the apparatus according to the invention has a reservoir in the form of another lock chamber into which lock chamber the condensate is let out and removed intermittently or continuously. It is the advantage of this embodiment that the pressure in the vacuum evaporation means can be kept more or less at a constant level. Letting out the condensate via the lock chamber avoids an interruption of the vacuum condensation caused by a collapse of the vacuum which would have to be built up again by pumps.

As an essential element, the apparatus according to the invention also comprises a means 5 for thermal treatment of the partially dried salts from the vacuum evaporation means 4. Even though other means known from the prior art can also be used, the means 5 according to the invention for thermal treatment of the partially dried salts is preferably a rotary tubular kiln 53. It is especially proven and therefore preferred to use a rotary tubular kiln having a diameter of 450 mm or more and a length of 1,500 mm or more. For example, such a rotary tubular kiln has a diameter in the range between 450 and 1,200 mm and a length in the range of 2,000 to 4,000 mm. However other measurements may also be used. Such a rotary tubular kiln 53 can advantageously be moved with a rotating speed in the range of 5 rotations/min to 20 rotations/min.

In a preferred embodiment the rotary tubular kiln 53 is positioned in such a way that it is inclined downwards at an angle (alpha) of 2° to 10°, preferably 3° to 5°, in relation to the horizontal line in the direction of the flow of the salt. This makes it possible to do without costly devices inside the rotary tubular kiln 53 which effect a propulsion of the salts. Rather, the salt follows the gravitational force and is successively conveyed to the highest temperature zone and through said zone to the exit.

In a further preferred embodiment the rotary tubular kiln 53 is heatable. Heating is advantageously effected by means of hot gases, preferably combustion gases. For this purpose, the chosen apparatus provides a burner 541, preferably a gas-burner, at a suitable position of the tubular rotary kiln 53, for example in the lid 54, the heating output of said burner being adaptable to the relevant requirements, for example the size of the kiln, the flow quantity or the humidity content of the added mineral salt.

In a suitable position, for example in the lid 54, the rotary tubular kiln 53 comprises openings or nozzles 542 which make possible the access of gases. Said openings or nozzles are preferably of a size allowing access of gases, especially oxygenic gases and quite particularly air, in a quantity corresponding to a surplus of 100 to 300%, preferably 200%, in relation to the oxygen amount necessary for complete combustion of all the remaining organic components of the mineral salts. The amount necessary to adapt to the relevant process situation can easily be determined by the person skilled in the art by measuring the oxygen concentration in the waste gases. The size of the access openings 542 is then adjusted accordingly. In this context care must be taken that only a light stream of gas may occur in the rotary tube 53, said stream providing sufficient oxygen for combustion and drawing off the humidity and waste gases contained in the salt, without, however, blowing off lighter salt crystals.

Figure 2:
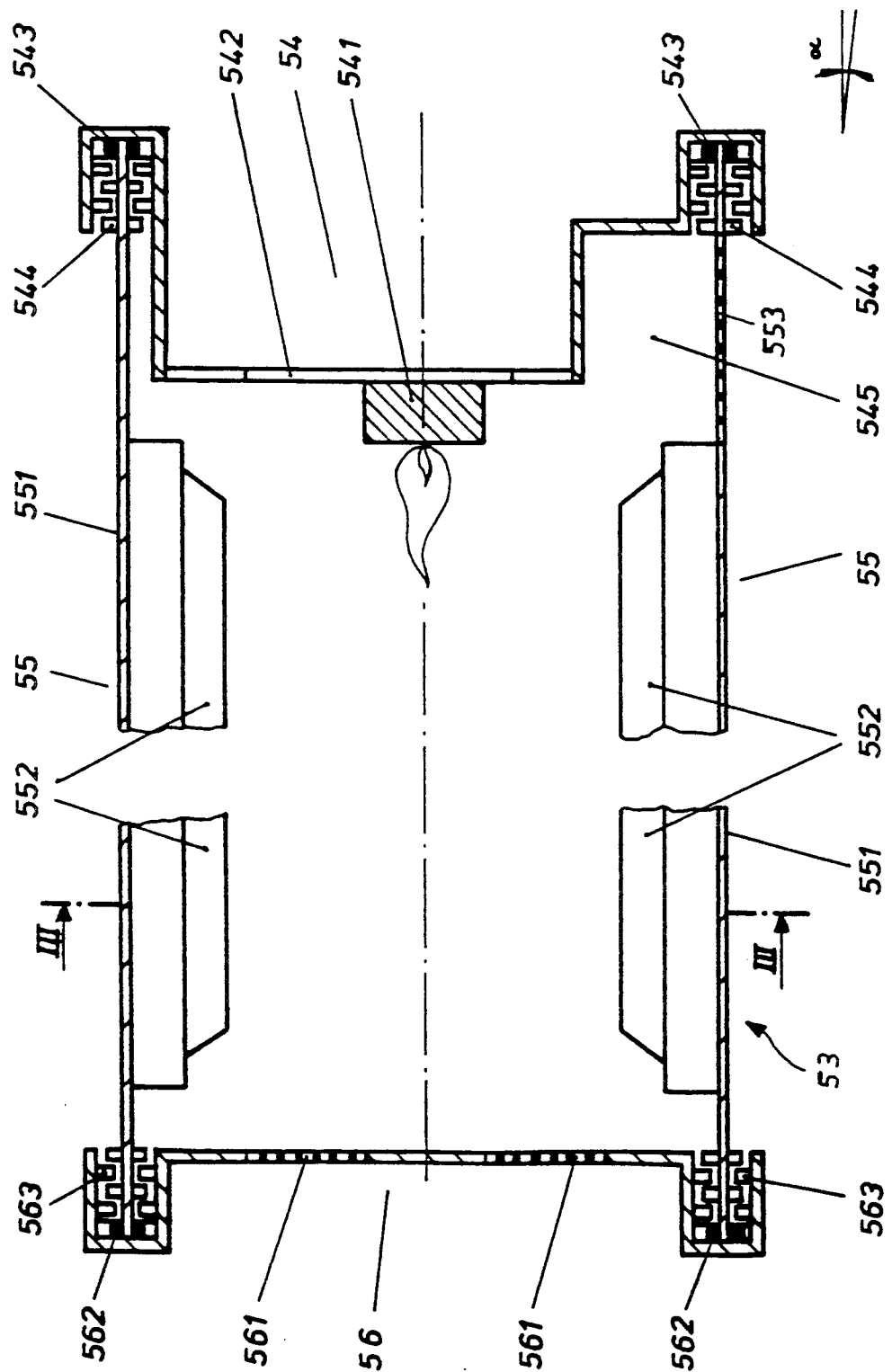
FIG. 2 shows a longitudinal section through the rotary tubular kiln 53 as the preferred embodiment of the means 5 for thermal treatment of the partially dried salts.

In an especially preferred embodiment which can be seen particularly clearly from FIG. 2, the rotary tubular kiln 53 essentially comprises (a) a stationary lid 54 comprising a burner device 541, a number of openings or nozzles 542 for the supply of gas, a bearing 543 including pressure-stabilized gaskets 544 and a chamber 545 for grinding and sieving said salts, said chamber being positioned at the bottom side of said lid 54;

(b) a stationary bottom 56 having a number of openings 561 for the withdrawal of gas and comprising a bearing 562 including pressure-stabilized gaskets; and (c) a cylinder 55 being rotatable around a longitudinal axis, the sides 551 of said cylinder 55 being supported by said bearing 543 of said lid 54 and said bearing 562 of said bottom 56, a multitude of driver blades 552 being positioned in longitudinal direction parallel to said longitudinal axis of said cylinder 55 and fixed at an angle ($\beta$) of substantially 90° relative to the sides 551 of said cylinder 55, and a sieve grate 553 corresponding in length to the length of said chamber 545 for grinding and sieving said salts.

The above-mentioned gaskets 544, 563 in the bearings 543, 562 of the lid 54 and the bottom 56 of the rotary tubular kiln can be optional gaskets known for this purpose from the prior art, as long as they protect the bearings against the access of salt. So-called "labyrinth gaskets" are preferably used in the apparatus according to the invention.

As mentioned above, the rotary tubular kiln 53 according to the invention is equipped with a chamber 545 for grinding and sieving made possible by a recess in the lid 54, in which chamber 545 the dried crystals are ground and sieved in such a way that the resulting mineral salt corresponds to the requirements of the users with regard to granular size. For this purpose, the chamber 545 for grinding and sieving preferably includes devices for grinding coarser crystals, especially preferably grinding balls. The advantage of grinding balls is to be seen in the fact that they automatically move in the chamber 545 for grinding and sieving during the rotating movement of the rotary tubular kiln 53, thus crushing coarser crystals or smashing stuck-together crystals. Therefore, separate grinding of the mineral salt is not required. Accordingly, it is also preferred that the openings of the sieve grate 553 through which grate the ground salt crystals are passing are variable according to the size of the salt crystals desired by the user. Crystals whose size does not permit passing through the adjusted openings are crushed by the grinding balls until they are able to pass the openings of the adjusted size.

Figure 3:
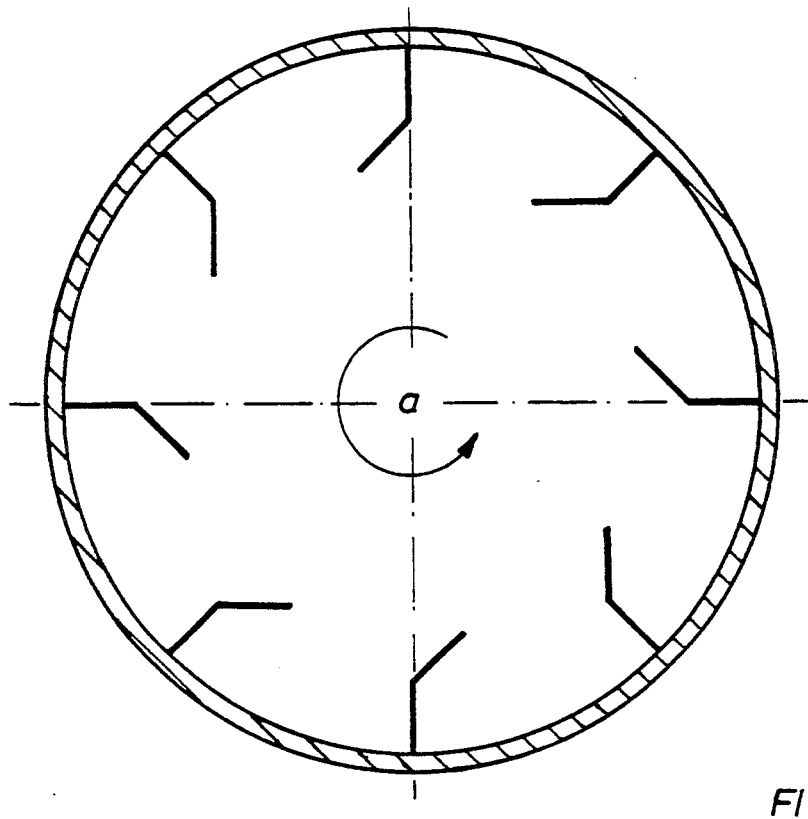
FIG. 3 shows a cross section through the rotary tubular kiln 53 at the spot designated with "3" in FIG. 2.
Figure 4:
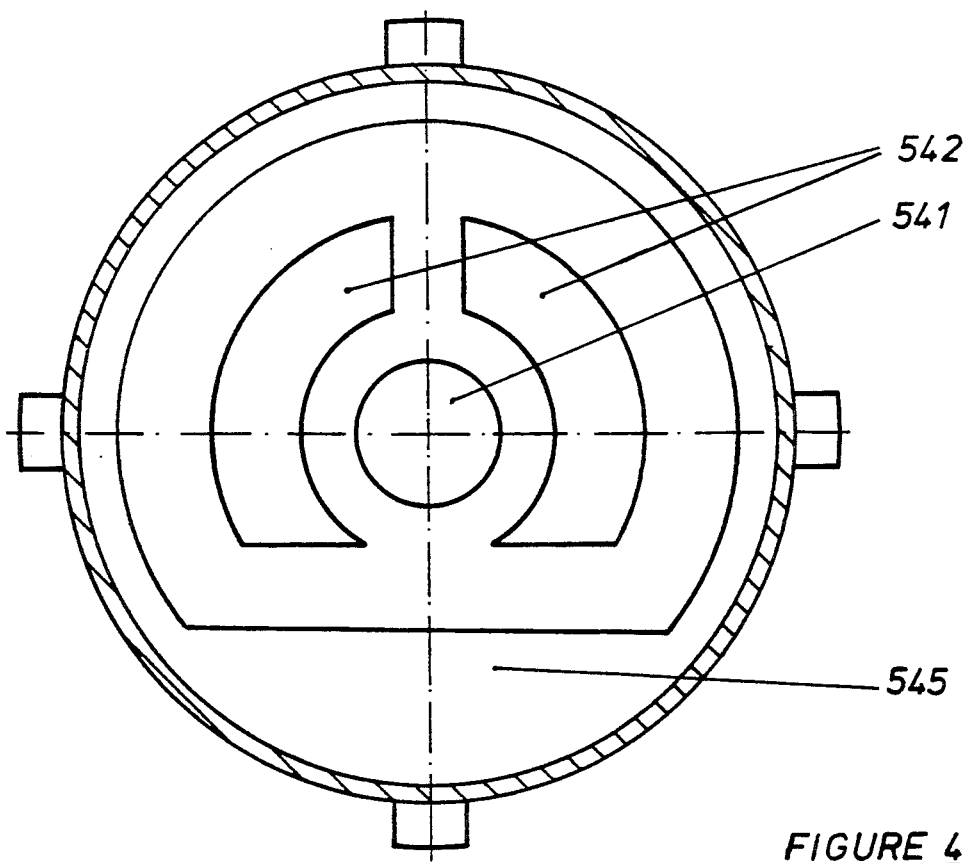
FIG. 4 shows a view from above of the lid 54 of the rotary tubular kiln 53.
Figure 5:
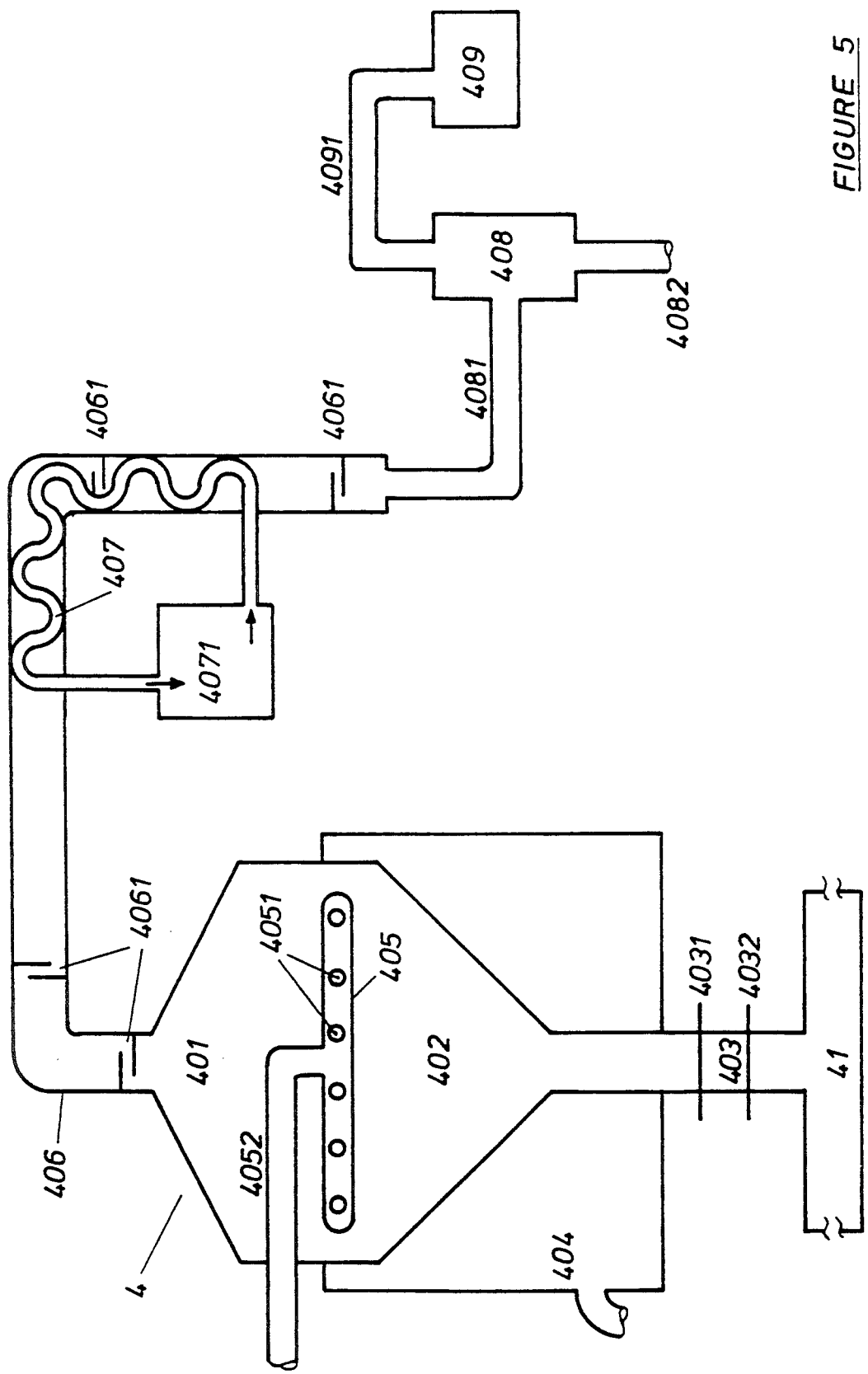
FIG. 5 shows a cross section through the vacuum evaporation means preferred according to the invention.

According to a further preferred embodiment, the driver blades 552 inside the cylinder body 55 of the rotary tubular kiln 53 are shaped in such a way that they are curved at an angle (gamma) of 120° to 150°, preferably 135°, in the rotating direction of the cylinder 55 of the rotary tubular kiln at the end opposite the cylinder grate 551. In this context, it is not mandatory, albeit preferred, that the driver blades 552 are bent at a sharp angle as can be seen from FIG. 3.

The means 4 for vacuum evaporation and the means 5 for thermal treatment of the partially dried mineral salts or mixtures thereof can either be connected immediately via a conveying means 41, for example a line, a conveyor spiral or such like. In a preferred embodiment of the invention the mineral salt or mixture thereof to be thermally treated is supplied to the rotary tubular kiln 53 via a stuffing conveyor means 46. This can, for example, be a cylinder 461 equipped with a lateral feed nozzle or feed container 462, in which cylinder 461 a stuffer 463 is moved manually or mechanically over a distance extending (in the flow direction of the supplied salt) from a point 464 in front of said lateral feed nozzle 462 to a point 465 beyond said lateral feed nozzle 462. By moving said stuffer 463 in said cylinder 461 while said feed nozzle 462 is closed a certain quantity of salt can be fed in the direction of the rotary tube 53. By doing so, the salt to be treated is fed to a tube 47 attached to the stuffing conveyor means 46 extending with its open end 472 into the supply opening of the rotary kiln 53. Suitable devices inside the tube, for example a cone 471 tapering in the flow direction of the mineral salt or mixture thereof, respectively, prevents the salt from dropping back into the area where the stuffer moves. The advantage of this stuffing conveyor means is to be seen in the fact that salt conveyed in the direction of the tubular kiln 53 does not clog the feed opening if the conveying must be interrupted for some reason and the mineral salt or mixture thereof, respectively, absorbs humidity in the conveying means 46 and sticks together when left standing for a longer period of time, for example over night.

The stuffing conveyor means preferred according to this invention makes it possible to restart conveying the mineral salt or mixture thereof, respectively, to the rotary tube 53 even after it has been left standing for a longer period of time.

According to another preferred embodiment of the invention it is also possible to connect said two means 4 and 5 by a comparable conveying means 43 leading via a storage tank 42. This is advantageous in those cases where other batches of mineral salts, for example the socalled waste salts from the operation or the residues from the reverse osmosis step, are to be supplied to the means 5 in addition to the salts from the vacuum evaporation means 4. The latter is carried out through the feeding lines 92 and/or 44.

The products obtained from the means 5 for thermal treatment of the mineral salts are either withdrawn and sold—either in packaged form or as bulk products—or supplied to a storage tank 6 via a withdrawing line 51 or such like.

The apparatus according to the invention also comprises a means 9 for reverse osmosis of the condensate from the condenser 7, said means 9 being connected to said condenser 7 either immediately via a line 71 or via lines 72 and 82 if a storage tank 8 is interposed. Optionally, the alternating pressure pumps 81 and 83, which are activated when a mininum or maximum level of liquid is reached in said storage tank 8, can be interposed in front of or behind said storage tank 8 in order to apply to said means 9 the process pressure in the range of 1 to 30 bar, preferably 5 to 20 bar, which is required for reverse osmosis.

The customary, commercially available units or means comprising individual, separately available and known parts such as vessel, membrane, connections for feeding and draining etc. can be used as means 9 for the reverse osmosis step. For reasons of easier serviceability, easier access for cleaning and repair works as well as the possibility to adjust the means to certain requirements a means comprised of individual, separately available parts is preferred.

The highly pure water obtained as permeate from the means 9 for reverse osmosis can either be drained immediately and filled into tanks or fed to a storage tank 10 via a withdrawing line 93 or such like. It is preferred not to dispose of the residue from the means 9 for reverse osmosis, but to redirect said residue either to the vacuum evaporation means 4 via line 91 or, as mentioned above, to the storage tank 42 via line 92 and subsequently to the means 5 for thermal treatment of the partially dried salts.

All components of the means are made of materials not corrodable by the mineral salts and the solutions thereof for which purpose a number of materials are available to the person skilled in the art. Stainless steel is especially preferred.

Below, the invention is illustrated with the aid of an example without, however, limiting the invention to the application within the field of recycling sodium chloride left over from the curing of raw hides.

EXAMPLE

According to analysis, sodium chloride obtained during centrifugal drying and scraping of salt from cured raw hides was comprised of the following before passage through the process according to the invention:
85.0 weight percent NaCl
0.4 weight percent naphthalene and
14.6 weight percent organic residues and humidity The salt war a dark red-brown in colour and emitted a foul, dung-like smell.

After adding siliceous earth as a flotation agent, 1,000 kg of such a brine were floated and 200 kg of a flotation residue obtained which was then dried at 60° C. and pulverised. From this resulted 120 kg of a dry powder usable as fodder.

The brine (800 l) containing about 15% of sodium chloride was treated in the vacuum evaporation means at 40° C. and a pressure of $10^{-1}$ bar. Together with 426 kg of heavily contaminated waste salt from the curing of hides, the partially dried sodium chloride (40% humidity) thus obtained was continuously supplied to a rotary tubular kiln operated at 350° C. (inclination alpha: 2°; peripheral speed: 10 rotations/min; diameter: 650 mm; length: 2,500 mm). The passage of the sodium chloride through the kiln took 60 minutes. After cooling, 498 kg of a pourable, white and odourless salt were obtained which proved to be pure (>99.5%) sodium chloride in analysis. The granular size was 0.3 mm.

The vapors of vacuum evaporation were expanded and condensed, and the condensate was cooled to room temperature and subjected to reverse osmosis. This was carried out with a membrane of polyamide/polysulphone composite material (pore diameter 0.5 nm) at a pressure of 14 bar, a temperature of 25° C. and a variable flow of 100 to 1,000 l/h.

With a salt content of 2 g sodium chloride/l the yield was approximately 60% of pure water in which no leftover salt could be found.

An additional experiment under comparable conditions resulted in about 52% of pure water with a salt content of 3 g sodium chloride/l.

The residue was subjected to the vacuum evaporation step once more.

I claim:
1. Apparatus for treatment of a mixture of brine and contaminated mineral salts comprising:
   (a) a means (1) for separating organic components from the mixture;
   (b) a means (4) for vacuum evaporation in order to partially dry said mixture;
   (c) a means (5) for thermal treatment of said partially dried mixture resulting from said means (4) for vacuum evaporation;
   (d) a condensing means (7) for condensing humid vapors resulting from said means (4) for vacuum evaporation;
   (e) a means (9) for reverse osmosis treatment of the condensate resulting from step (d);
   (f) conveying means (13, 91, 93) connecting in series said means (1) for separating organic components, said means (4) for vacuum evaporation, said condensing means (7) and said means (9) for reverse osmosis treatment, and conveying means (41) connecting said means (4) for vacuum evaporation and said means (5) for the thermal treatment of said mixture; and
   g) a means (2) for drying and powdering said separated organic components.
2. Apparatus according to claim 1 wherein said means (1) for separating organic components from the mixture is a flotation means, a decanter or a centrifuge.
3. Apparatus according to claim 1 wherein said means (4) for vacuum evaporation comprises a vessel (401) in the shape of a cylinder having attached at its lower end a tapered cone (402); said vessel (401) comprising a feeding line (4052) leading to an annular nozzle (405) for spraying a solution containing said mixture within said vessel (401); at least one lock chamber (403) at the bottom of said vessel (401) for removing said partially dried mixture; and a tube (406) for removing water vapor from the top of said vessel (401) comprising at least one vapor trap (4061) and wherein said condensing means (7) comprises a cooling device (407) for condensing the water vapor, said cooling device (407) being fitted into said tube (406); at least one lock chamber (408) for removing the condensed liquid; and at least one vacuum pump (409) in communication with said at least one lock chamber.
4. Apparatus according to claim 1 wherein said means (5) for the thermal treatment of said partially dried mixture resulting from the step of vacuum evaporation is a rotary tubular kiln (53).
5. Apparatus according to claim 4 wherein the rotary tubular kiln (53) substantially comprises:
   (a) a stationary lid (54) comprising a burner device (541), a plurality of openings or nozzles (542) for supply of gas, a bearing (543) including pressure stabilized gaskets (544) and a chamber (545) for grinding and sieving said salts of the mixture said chamber being positioned at the bottom side of said lid (54);
   (b) a stationary bottom (56) having a plurality of openings (561) for withdrawal of gas and comprising a bearing (562) including pressure-stabilized gaskets (563); and
   (c) a cylinder (55) being rotatable around a longitudinal axis, the sides (551) of said cylinder (55) being supported by said bearing (543) of said lid (54) and said bearing (562) of said bottom (56), a plurality of driver blades (552) being positioned in longitudinal direction parallel to said longitudinal axis of said cylinder (55) and fixed at an angle of substantially 90° relative to the sides (551) of said cylinder (55), and a sieve grate (553) corresponding in length to the length of said chamber (545) for grinding and sieving said salts of the mixture.

6. Apparatus according to claim 1 wherein said means (5) for the thermal treatment of said partially dried mixture is a rotary tubular kiln (53) which is heated by means of hot gases from a combustion in a gas burner.

7. Apparatus according to claim 1, additionally comprising a storage tank (42) between said means (4) for vacuum evaporation and said means (5) for the thermal treatment of said partially dried mixture.

8. Apparatus according to claim 7, additionally comprising a supply line (44) for supplying waste salts into said additional storage tank (42).

9. Apparatus according to claim 7, additionally comprising a supply line (92) between the means (9) for reverse osmosis and said additional storage tank (42).

10. Apparatus according to claim 1, additionally comprising at least one storage tank (3, 6, 10) for said separated, dried and powdered organic components.

* * * * *